United States Patent
Brousseau

(10) Patent No.: US 9,444,108 B2
(45) Date of Patent: Sep. 13, 2016

(54) ADDITIVE MANUFACTURING FOR FUEL CELL FLOW FIELDS

(71) Applicant: Hamilton Sundstrand Corporation, Charlotte, NC (US)

(72) Inventor: Guillaume M. Brousseau, Woodstock, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 148 days.

(21) Appl. No.: 14/253,508

(22) Filed: Apr. 15, 2014

(65) Prior Publication Data

US 2015/0295251 A1 Oct. 15, 2015

(51) Int. Cl.
*H01M 8/02* (2016.01)
*B33Y 10/00* (2015.01)
*B33Y 80/00* (2015.01)

(52) U.S. Cl.
CPC ............. *H01M 8/026* (2013.01); *B33Y 10/00* (2014.12); *B33Y 80/00* (2014.12); *H01M 8/0234* (2013.01); *Y02E 60/50* (2013.01); *Y02P 70/56* (2015.11)

(58) Field of Classification Search
CPC ..................................................... H01M 8/026
See application file for complete search history.

(56) References Cited

U.S. PATENT DOCUMENTS

| | | | | |
|---|---|---|---|---|
| 2008/0199738 A1* | 8/2008 | Perry | .................. | H01M 8/026 429/444 |
| 2012/0021329 A1* | 1/2012 | Yamauchi | ........... | H01M 8/0243 429/480 |
| 2013/0177827 A1* | 7/2013 | Okabe | ................ | H01M 8/0258 429/434 |
| 2014/0057193 A1* | 2/2014 | Wilkosz | ............. | H01M 8/0254 429/457 |

* cited by examiner

Primary Examiner — Stewart Fraser
(74) Attorney, Agent, or Firm — Locke Lord LLP

(57) ABSTRACT

A plate for a fuel cell includes a first plate body defining a first flow field channel in a first surface thereof. The first flow field channel has a cross-sectional area that varies as a function of depth from the first surface of the plate body toward an opposed second surface. The cross-sectional area can increase and/or decrease from the first surface toward the opposed second surface.

7 Claims, 3 Drawing Sheets

ADDITIVE MANUFACTURING FOR FUEL CELL FLOW FIELDS

BACKGROUND OF THE INVENTION

1. Field of the Invention

The present disclosure relates to flow field plates for fuel cells and to methods of manufacturing flow fields plates.

2. Description of Related Art

A fuel cell is a device that converts chemical energy into electricity through a chemical reaction between oxygen and another oxidizing agent, such as hydrogen or carbon based fuels. There are many types of fuel cells, but they typically consist of an anode, a cathode and an electrolyte that allows charges to move between the two sides of the fuel cell. Electrons are drawn from the anode to the cathode, producing direct current electricity. Each end of the typical fuel cell contains a plate made of strong, lightweight, electron-conducting material (often graphite, metal, or a composite). These plates include channels to provide a "flow field" through which fuel (on the anode side) and oxygen (on the cathode side) can be supplied to the fuel cell. Single fuel cells are then stacked to create additional capacity.

Generally, the channels of the flow field are machined or molded into a bi-polar plate. The separate plates are then pressed against a gas diffusion layer to allow for even gas diffusion onto a membrane electrode assembly. The process of machining flow fields utilizes special tooling and processing for graphite plates. Machining the flow field can create stress points within the plate that must be structurally accommodated, which typically requires the plate to be of a thickness and/or weight greater than desired. The added thickness and/or weight is contrary to typical designs that seek fuel cells that are relatively smaller and lightweight.

Such conventional methods and systems have generally been considered satisfactory for their intended purpose. However, there is still a need in the art for improved fuel cells and methods of the same. The present disclosure provides a solution for this need.

SUMMARY OF THE INVENTION

A plate for a fuel cell includes a first plate body defining a first flow field channel in a first surface thereof. The first flow field channel has a cross-sectional area that varies as a function of depth from the first surface of the plate body toward an opposed second surface. The cross-sectional area of the first flow field channel can increase and/or decrease as a function of depth from the first surface toward the opposed second surface.

The plate can include a second plate body defining a second flow field channel in a first surface thereof. Similar to the first flow field channel of the first plate body, the second flow field channel can have a cross-sectional area that varies as a function of depth from the first surface of the second plate body toward an opposed second surface thereof. The first surface of the second plate body can be mounted adjacent the first surface of the first plate body such that the first flow field channel and the second flow field channel define a continuous flow field path. The cross-sectional area of the second flow field channel can increase and/or decrease from the first surface of the second plate body to the second surface thereof.

The cross-sectional area of the flow field path perpendicular to the first surfaces can be I-shaped. A width of a first end of the flow field path can be less than a width of a second end.

A method of forming a flow field channel for a fuel cell includes forming a flow field channel on a first plate body by additively forming channel walls directly onto the first plate body. The step of forming can further include additive layer manufacturing of sequential layers to form the channel walls.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 2:
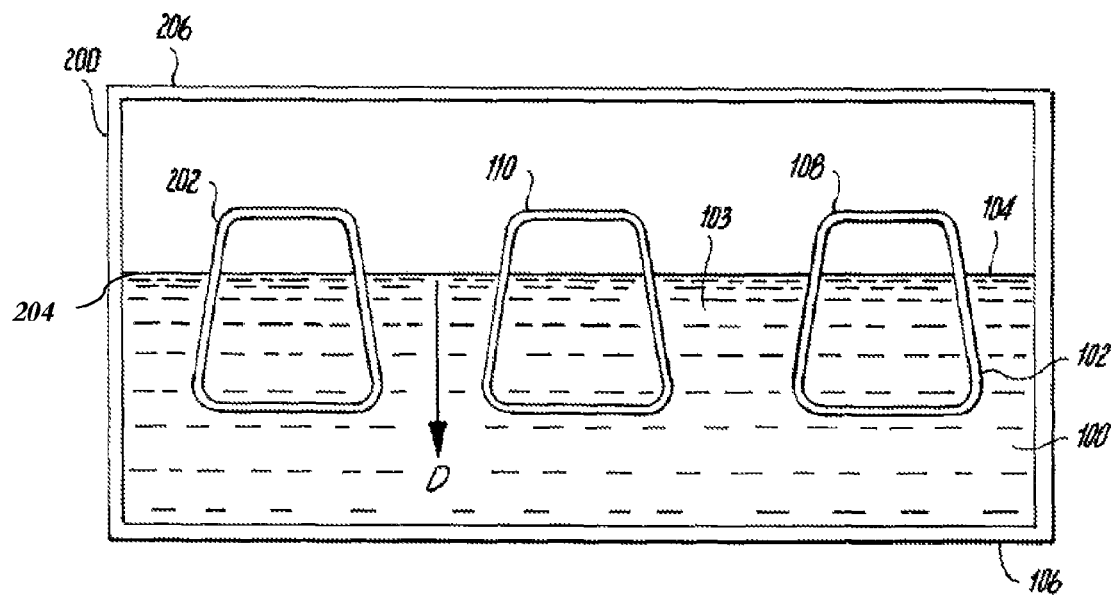
FIG. 2 is a cross-sectional view of an exemplary embodiment of a plate for a fuel cell constructed in accordance with the present disclosure, showing the cross-sectional area varying as a function of depth.

Reference will now be made to the drawings wherein like reference numerals identify similar structural features or aspects of the subject disclosure. For purposes of explanation and illustration, and not limitation, a partial view of an exemplary embodiment of a plate body for a fuel cell in accordance with the disclosure is shown in FIG. 2 and is designated generally by reference character 100. Other embodiments of the plate body in accordance with the disclosure, or aspects thereof, are provided in FIGS. 3-5, as will be described.

Figure 1A:
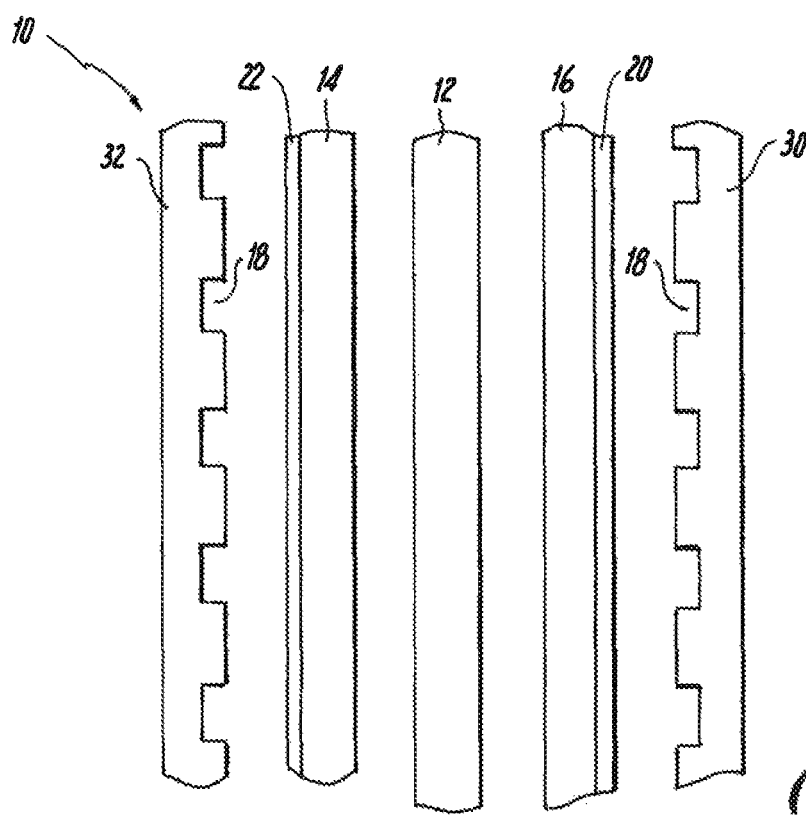
FIG. 1A is a is a cross-sectional view of a fuel cell as known in the prior art.
Figure 1B:
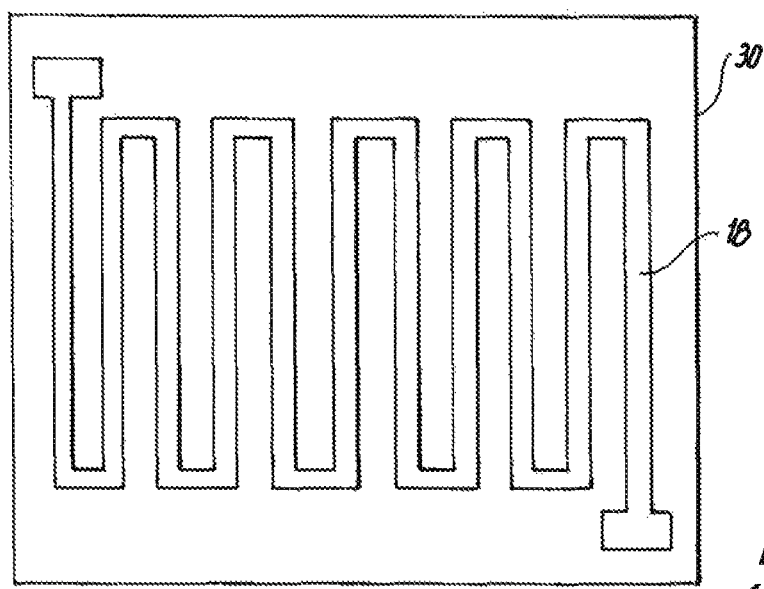
FIG. 1B is a plan view of a flow field plate of the fuel cell of FIG. 1A.

A structure of a fuel cell known in the prior art is described with references made to FIGS. 1A-1B. FIG. 1A shows a cross-sectional view of a single fuel cell 10. The fuel cell 10 includes a membrane electrode assembly 12 which includes catalytic electrodes 14 and 16. The catalytic electrodes 14 and 16 may serve as an anode and a cathode of the fuel cell 10, respectively. The fuel cell 10 further includes gas diffusion layers 20 and 22. The gas diffusion layers 20 and 22 are used to aid in gas diffusion to the catalytic electrodes 14, 16 for reaction. Gases such as oxygen and another oxidizing agent, such as hydrogen or carbon based fuels are distributed along fluid flow field plates 30 and 32. The hydrogen combines with the oxygen to form water while at the same time generating an electrical current. In order to ensure that the gas is distributed evenly, the fluid flow field plates 30 and 32 are disposed on the outer sides of the gas diffusion layers 20 and 22, respectively. In order to obtain a desired voltage, a plurality of fuel cells 10 may be stacked together in series as a fuel cell stack in order to achieve the desired energy production.

FIG. 1B shows a plan view of the fluid flow field plate 30. The fluid flow field plate 30 includes channels 18 etched, molded or machined into the surface. These channels 18 help the fluid to be distributed evenly on the reaction surface of the fluid flow field plate 30. Even distribution of the gases through the fluid flow plate 30 is ideal since uneven distribution of fluid flow over the channels may introduce dispersion, leading to a loss in the conversion of chemical to electrical energy. Moreover, an uneven flow distribution increases the pressure drop compared with an even distribution. Typically the channels are machined or molded into the plates of the fuel cell and then pressed against the gas diffusion layer within a fuel cell stack. However, these techniques require special tooling which can add undesired costs, and processing which can create undesired stress to the fuel cell stack.

FIG. 2 illustrates plate body 100 in accordance with the present invention. The plate body 100, for example, a gas diffusion layer, defines a first flow field channel 102 in a first surface 104 thereof. The first flow field channel 102 has a cross-sectional area that varies as a function of depth D from the first surface 104 of the plate body 100 toward an opposed second surface 106. It is contemplated that the first flow field channel 102 is manufactured by additive manufacturing. In this manner, the first flow field channel 102 is created by forming channel walls 103 layer by layer directly onto the plate body 100. This manufacturing method allows for applying a precise amount of material, for example, graphite, directly onto the plate body 100 to create the first flow field channel 102 that is relatively thin and with any channel height and width as needed for the fuel cell. Using additive manufacturing further allows the first flow field channel 102 to be created in any suitable pattern for a particular application.

With continued reference to FIG. 2, the cross-sectional area of the first flow field channel 102 increases in a direction from the first surface 104 to the opposed second surface 106. Accordingly, the cross-sectional area tapers outwardly, widening deeper in the plate body 100. This tapering of the first flow field channel 102 allows for a controlled pressure drop by controlling the rate of gas flow through the plate body by controlling the flow volume in comparison to the rate of flow as in a channel with no taper. The taper can be adjusted depending on how great a restriction the plate body 100 creates and the desired gas flow to the electrodes. Using the technique of additive manufacturing allows for creating the specific channel profile of the first flow field channel 102 to also maximize flow volume within the fuel cell. In addition, the first flow field channel 102 can optionally include beveled corners 108 to reduce undesired contact stress between the first flow field channel 102 and the plate body 100.

Figure 3:
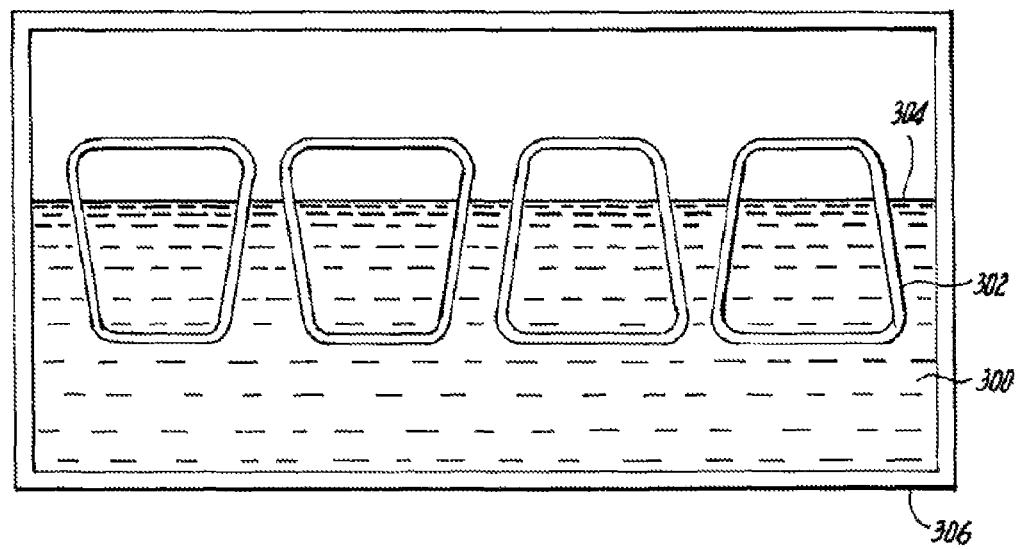
FIG. 3 is a cross-sectional view of an additional embodiment of the plate of FIG. 2.

In certain embodiments, the cross-sectional area of a channel decreases from the first surface 304 to the opposed second surface 306 as shown in FIG. 3. In this embodiment, the cross-sectional area of the first flow field channel tapers inwardly moving deeper into the plate body 300. In FIG. 3 a plurality of first flow field channels 302 are shown. The first flow field channels 302 can be patterned by including channels that taper inwardly and channels that taper outwardly. This pattern can also control the pressure drop within the fuel cell by controlling flow volume through the plate body.

In addition, a second plate body 200 defining a second flow field channel 202 in a first surface 204 thereof can be manufactured using additive manufacturing. The second flow field channel 202 has a cross-sectional area that varies as a function of depth from the first surface 204 of the second plate body toward an opposed second surface 206. The first surface 204 of the second plate body 200 is adjacent the first surface 104 of the first plate body 100 such that the first flow field channel 102 and the second flow field channel 202 define a continuous flow field path 110. More specifically, the second plate body 200, for example, a water transport plate with the second flow field channel 202 may be pressed together with the first plate body 100 such that the first surface 104 of the first plate body 100 and the first surface 204 of the second plate body 200 are adjacent. As the first surfaces 104, 204, respectively, are pressed together the first and second flow field channels 102, 202 create one continuous flow field path 110. As shown in FIGS. 2 and 3 a plurality of flow field paths 110 can be layered into the first and second plate bodies 100, 200 to resemble flow fields plates 30, 32 such as those of fuel cell 10. Further, first and second plate bodies 100, 200 with the flow field path 110 layered therein allow for the height of a fuel cell stack to be significantly reduced along with the stack cost.

Figure 4:
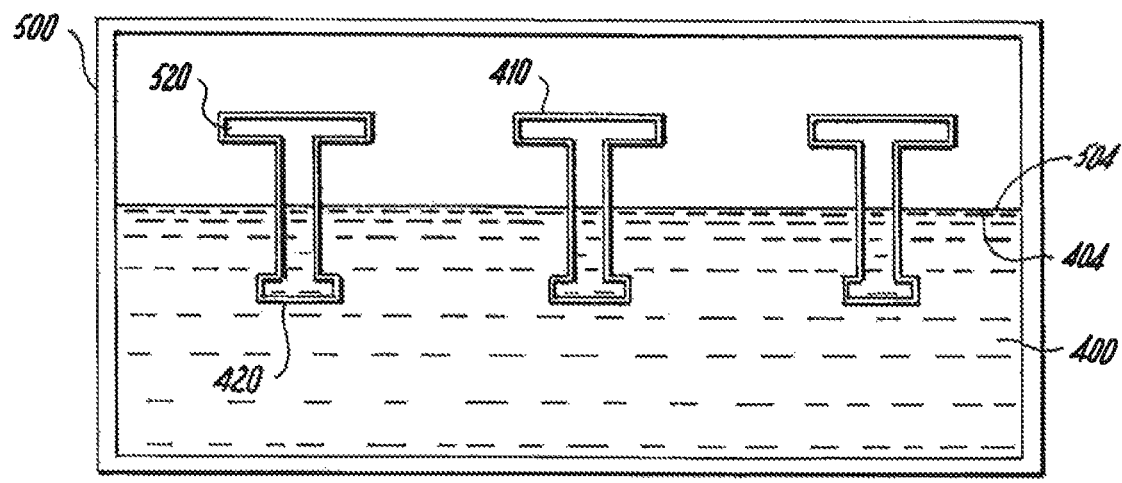
FIG. 4 is a cross-sectional view of another embodiment of the plate of FIG. 2.

FIG. 4 illustrates an additional embodiment of the first and second plate bodies 400, 500 with a continuous flow field path 410. In this embodiment, the cross-section of the flow field path 410, when viewed perpendicular to the first surfaces 404, 504, is I-shaped, e.g., resembles the cross-sectional shape of at least a portion of an I-beam shaped structure. This design enhances fuel cell contact surfaces and reduces pressure drop in the fuel cell. A first end 420 of the channel cross-section can be smaller in width than an opposed second end 520. Each of the designs and/or patterns illustrated in FIGS. 2-4 can be created through forming the first and second flow field channels into each respective plate body using additive manufacturing by forming the respective channel walls. This enables the plate bodies to be created without the need for special tooling. Those skilled in the art will recognize that additional designs and/or patterns may be created to allow for flow field channels that reduce stress and processing costs for a fuel cell and maximizing flow distribution.

Figure 5:
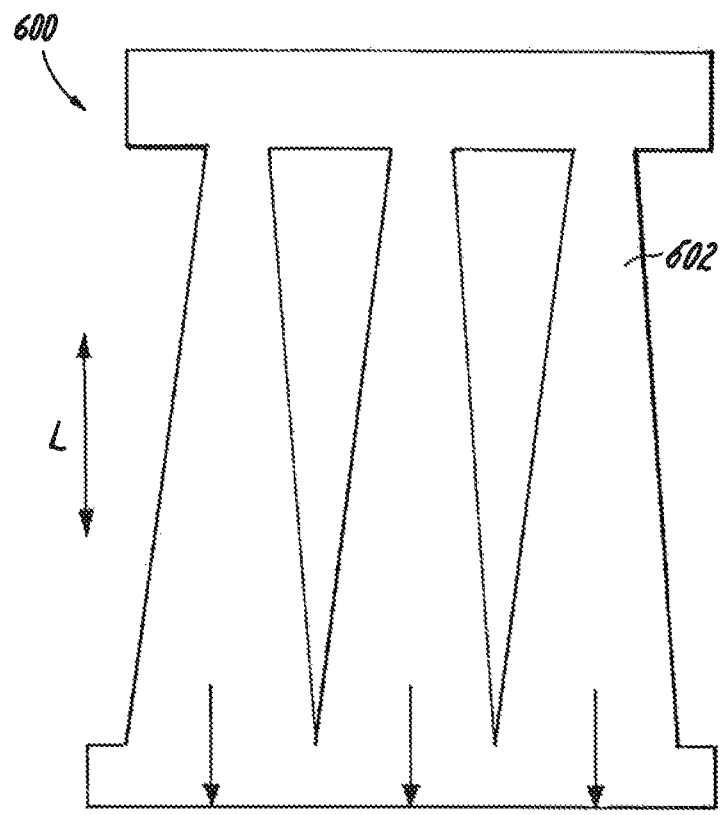
FIG. 5 is a plan view of another exemplary embodiment of a plate, showing channels that vary in cross-section as function of longitudinal position.

FIG. 5 illustrates another exemplary embodiment of the present disclosure wherein a first flow field channel 602 within a first plate body 600 varies in cross-sectional area in the longitudinal direction. As shown in FIG. 5, the cross-sectional area of the flow field channel 602 increases and/or decreases as a function of length L. This variation of cross-sectional area is in addition to or in lieu of varying cross-sectional area as a function of depth D.

Those skilled in the art will recognize that the fuel field paths shown and described can be created within one fuel cell or a fuel cell stack. For example, the flow field paths shown in FIGS. 2 and 3 can be intermixed with the flow field path shown in FIG. 4. The technique of additively manufacturing the flow field paths allows for creation of unique patterns without the need for special tooling. In addition, varying materials may be used to vary the composition of the plate bodies. For example, using additive manufacturing, different materials may be layered to create a flow field path that is half hydrophobic and half hydrophilic to manage the moisture collection within the flow field path.

The methods and systems of the present disclosure, as described above and shown in the drawings, provide for flow field channels for a fuel cell with superior properties including improved channel geometry. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A plate for a fuel cell comprising:
   a first plate body defining a first flow field channel in a first surface thereof, wherein the first flow field channel has a cross-sectional area that varies as a function of depth from the first surface of the plate body toward an opposed second surface; and
   a second plate body defining a second flow field channel in a first surface thereof, wherein the second flow field channel has a cross-sectional area that varies as a function of depth from the first surface of the second plate body toward an opposed second surface, wherein the first surface of the second plate body is adjacent the first surface of the first plate body such that the first flow field channel and the second flow field channel define a continuous flow field path.

2. The plate of claim 1, wherein the cross-sectional area of the first flow field channel increases from the first surface toward the opposed second surface.

3. The plate of claim 1, wherein the cross-sectional area of the first flow field channel decreases from the first surface toward the opposed second surface.

4. The plate of claim 1, wherein the cross-sectional area of the second flow field channel increases from the first surface toward the opposed second surface.

5. The plate of claim 1, wherein the cross-sectional area of the second flow field channel decreases from the first surface toward the opposed second surface.

6. The plate of claim 1, wherein the cross-sectional area of the flow field path perpendicular to the first surface of the first plate body and the first surface of the second plate body is I-shaped.

7. The plate of claim 6, wherein a width of a first end of the flow field path is less than a width of a second end.

* * * * *